United States Patent [19]

Wright et al.

[11] 3,899,987

[45] Aug. 19, 1975

[54] FAIL-SAFE CONTROL SYSTEM FOR HYDROFOIL CRAFT

[75] Inventors: Willard E. Wright, Bellevue; Andrew D. Tweeddale, Issaquah, both of Wash.

[73] Assignee: The Boeing Company, Seattle, Wash.

[22] Filed: Apr. 10, 1974

[21] Appl. No.: 459,466

[52] U.S. Cl. ............................ 114/66.5 H; 318/588
[51] Int. Cl.² ............................................ B63B 1/18
[58] Field of Search ............... 114/66.5 H, 122, 126; 235/153 AE; 244/77 M; 307/204, 219; 318/563–565, 585, 588; 340/146.1 B, 340/146.1 BE

[56] References Cited
UNITED STATES PATENTS

| | | | |
|---|---|---|---|
| 3,100,861 | 8/1963 | Osder | 244/77 M X |
| 3,156,209 | 11/1964 | Ask | 114/66.5 H |
| 3,379,951 | 4/1968 | Franchi et al. | 244/77 M X |
| 3,433,125 | 3/1969 | Gemmell | 318/564 X |
| 3,800,727 | 4/1974 | Stark et al. | 318/588 X |

*Primary Examiner*—Trygve M. Blix
*Assistant Examiner*—Stephen G. Kunin
*Attorney, Agent, or Firm*—Brown, Murray, Flick & Peckham

[57] ABSTRACT

A control system for hydrofoil craft of the type which employs dual port control surfaces or flaps and dual starboard control surfaces for controlling motion of the craft about its roll axis. Apparatus is provided for sensing motion about the roll axis of the craft and for producing at least one signal proportional thereto. Three roll channels responsive to a roll signal are provided, one of which controls the starboard outboard control surface, one of which controls the port outboard control surface, and the third of which controls both the port and starboard inboard control flaps. Failure of any one channel will not seriously affect the operation of the craft since failure of both inboard flaps, responsive to one control channel, is equal to failure of either of the outboard flaps which are controlled by separate channels. Preferably, at least two roll gyros are employed, one of which controls a first outboard control surface, the other of which controls a second outboard control surface, and the combined (e.g., mixed) outputs of which control both inboard control surfaces. In the embodiment of the invention shown herein, each control channel also transmits to the control surfaces one or both outputs of dual helm synchros, the arrangement being such that the control surfaces are initially actuated to cause the craft to bank and turn followed by rudder actuation to coordinate the turn.

6 Claims, 4 Drawing Figures

FAIL-SAFE CONTROL SYSTEM FOR HYDROFOIL CRAFT

BACKGROUND OF THE INVENTION

As is known, in a hydrofoil seacraft, the hull of the craft is lifted out of the water by means of foils which are carried on struts and usually pass through the water beneath the surface thereof. In passing through the water, and assuming that sufficient speed is attained, the foils create enough lift to raise the hull above the surface and, hence, eliminate the normal resistance encountered by a ship hull in passing through the water.

In the usual case, there are forward and aft foils both provided with control flaps similar to those used on aircraft, although in some cases the entire foils may be rotatable and used as control surfaces. The other essential control element is the rudder which pierces or is submerged beneath the surface of the water and may be either forward or aft of the craft, depending upon its design. In most hydrofoils, the flaps or control surfaces are used primarily to cause the craft to ascend or descend and to control the craft about its pitch and roll axes. However, they can also be used in combination with the rudder to bank the craft about its roll axis during a turn. The flaps are also used to stabilize the craft during movement on water so that pitching or rolling motions can be minimized by proper counterbalancing movement of the flaps. A control system of this type is disclosed and claimed in copending application Ser. No. 302,559, filed Oct. 31, 1972 and assigned to the Assignee of the present application. The invention described herein is particularly useful in a system of this type; although its usefulness is not necessarily restricted to that particular system.

In any hydrofoil control system, safety is a paramount consideration, particularly in the roll control channel. In the type of control mentioned above, the roll control channel comprises sensing means for sensing motion of the craft about the roll axis and means responsive to the signals generated by this sensing means to effect the desired movement of the control surfaces to counteract the rolling motion and stabilize the craft about its roll axis. In case of a failure or malfunction of this roll control channel, an unsafe condition can develop in which the motion of the craft becomes unstable; and the craft can exhibit divergent motions such that it may impact the water with angular rates of motion and attitudes that can endanger personnel on board the craft and cause possible damage to the ship.

SUMMARY OF THE INVENTION

In accordance with the present invention, a roll control system is provided for a hydrofoil craft wherein dual port and starboard control flaps or surfaces are employed together with three roll control channels, one of which actuates the outboard starboard control flap, the other of which actuates the outboard port control flap, and the third of which actuates both of the inboard control flaps. The invention is premised on the fact that the outboard port and starboard control flaps, because of their greater moment arms, have greater control effectiveness than the inboard control flaps. Consequently, the failure of both inboard control flaps will produce a result which is approximately equal to failure of either outboard control flap. This enables the use of three control channels to achieve a high degree of reliability while minimizing the degree of redundancy required.

Specifically, and in accordance with the invention, means such as a roll gyro is provided for sensing motion of the craft about its roll axis and for producing an electrical signal proportional thereto. In the preferred embodiment of the invention, at least two roll gyros are employed, one of which feeds into a first outboard roll channel, the second of which feeds into the second outboard roll channel and the combined outputs of which are applied to the roll channel for both inboard flaps. Alternatively, a separate third roll gyro can be used for the inboard roll control channel.

Again, in the preferred embodiment of the invention, the hydrofoil craft is caused to turn by initially banking the craft about its roll axis, followed by actuation of the rudder to give a smooth turning action. In this arrangement, the output from two or more helm synchros are compared with the roll signals in the various roll control channels to initially start the banking action at the beginning of a turn. For this purpose, two or three helm synchros can be employed.

The above and other objects and features of the invention will become apparent from the following detailed description taken in connection with the accompanying drawings which form a part of this specification, and in which.

Figure 1:
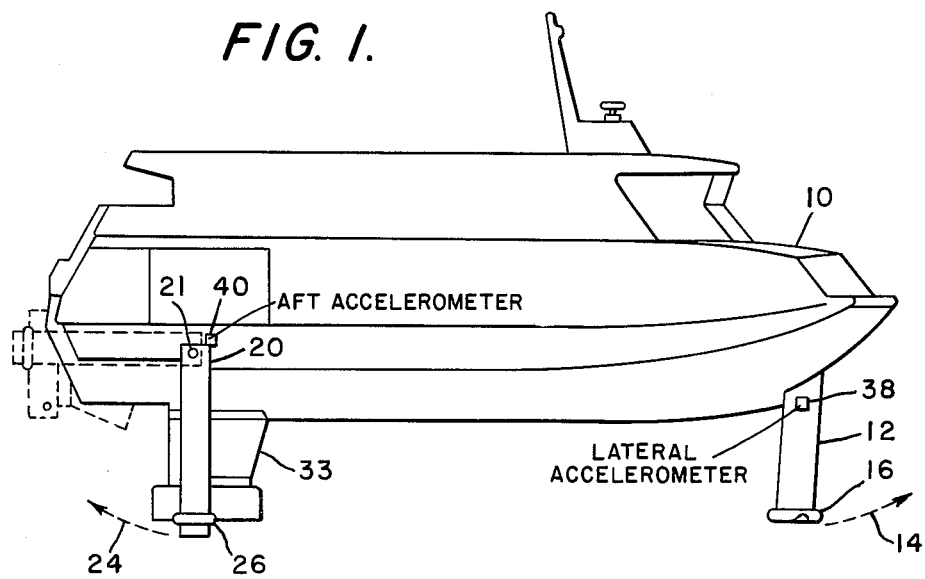
FIG. 1 is a side view of a typical hydrofoil craft with which the control system of the present invention may be used.

Referring now to the drawings, and particularly to FIG. 1, the hydrofoil shown includes a conventional hull 10 which can be provided with a propeller or the like and an inboard motor such that it can traverse the surface of water as a conventional displacement ship. Pivotally connected to the hull is a forward, swiveled strut or rudder 12 which is rotatable about a vertical axis in order to steer the craft in the foil-borne mode of operation. The rudder 12 can also be swiveled upwardly in the direction of arrow 14 to clear the surface of the water when the craft is operating as a conventional displacement ship. Carried on the lower end of the rudder 12 is a forward foil 16 (FIG. 2) which carries at its trailing edge control surfaces or flaps 18 which are interconnected and operate in synchronism. Alternatively, the entire forward foil can be rotated for control. Thus, there is a single forward control surface which may be either a flap or the entire foil.

In the aft portion of the craft, struts 20 and 22 are pivotally connected to the hull 10 about an axis 21. The struts 20 and 22 can be rotated downwardly into the solid-line position shown in FIG. 1 for foil-borne operation, or can be rotated backwardly in the direction of arrow 24 and into the dotted-line position shown when the craft operates as a conventional displacement ship. Extending between the lower ends of the struts 20 and 22 is an aft foil 26 which carries at its trailing edge two starboard flaps 28 and 30 and two port flaps 32 and 34. Alternatively, the entire starboard and port foils can be rotated to serve as control surfaces. Each set of starboard flaps and each set of port flaps normally operate in synchronism.

Carried between the struts 20 and 22 and pivotally connected to the hull 10 about axis 21 is a gas turbine-water jet propulsion system 33 which provides the forward thrust for the craft during foil-borne operation. It should be understood, however, that a propeller or other type of thrust-producing device can be used in accordance with the invention.

With the rudder 12 and struts 20 and 22 retracted, the craft may operate in the hull-borne mode. In the foil-borne mode of operation, both the rudder 12 and its foil 16, and struts 20 and 22 with foil 26, are rotated downwardly into the solid-line positions shown in FIG. 1 and locked in position. In order to become foil-borne, the pilot sets the desired foil depth in a manner hereinafter described and the throttles are advanced. The craft, therefore, will accelerate and the hull will clear the water and continue to rise until it stabilizes at the commanded foil depth. The normal landing procedure is to simply reduce the throttle setting, allowing the ship to settle to the hull as the speed decays.

Figure 2:
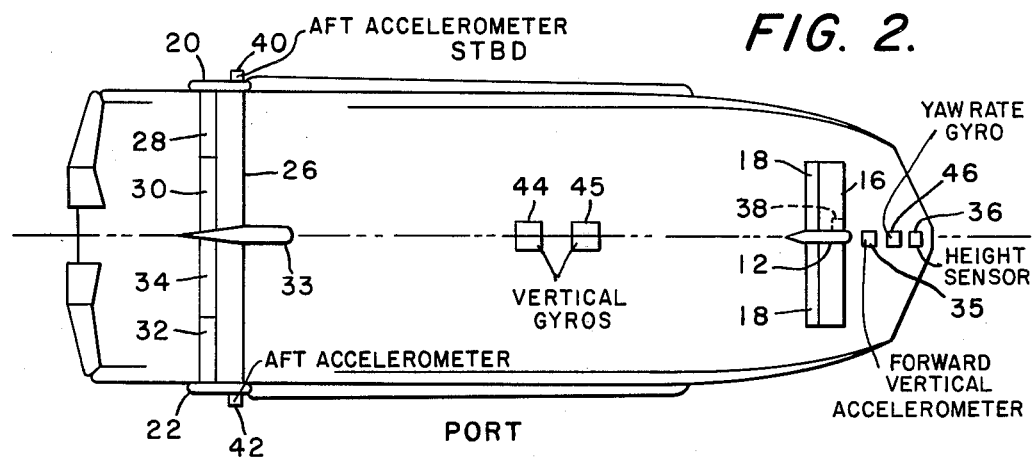
FIG. 2 is a bottom view of the craft shown in FIG. 1.

Mounted on the hull, as shown in FIG. 2, are sensors for producing electrical signals indicative of craft motion. Thus, at the bow of the craft is a height sensor 36 which produces an electrical signal proportional to the height of the bow above the surface of the water during foil-borne operation. Also at the bow of the craft is a forward vertical accelerometer 35 which produces an electrical signal proportional to vertical acceleration. Mounted on or near the rudder 12 is a lateral accelerometer 38 which produces an electrical signal proportional to lateral or sideways acceleration of the bow of the craft. Mounted on or near the top of the starboard strut 20 is an aft starboard vertical accelerometer 40; and mounted on or near the top of the port strut 22 is an aft port vertical accelerometer 42. Means are also provided for sensing motion of the craft about its pitch and roll axes; and two such sensors are provided. For this purpose, two vertical gyros 44 and 45 are mounted in the craft and produce signals proportional to the angle of the craft with respect to vertical about its pitch and roll axes. The devices 44 and 45 are preferably identical and normally produce substantially identical signals. Finally, a yaw rate gyro 46 is provided. The accelerometers and the gyros as described will thus sense motions of the craft about its roll, pitch and yaw axes.

Any movement about the roll axis will be sensed by the vertical gyros 44 and 45 as well as the aft accelerometers 40 and 42. The gyros 44 and 45 will produce identical output signals proportional to the amount or degree of roll, while the accelerometers 40 and 42 will produce signals proportional to the angular rotation about the roll axis as well as to vertical aft acceleration. Any movement about the pitch axis will be sensed by the vertical gyros 44 and 45 as well as both the forward and aft accelerometers 35, 40 and 42. Finally, any movement about the yaw axis will be sensed by the yaw rate gyro 46 as well as by the lateral accelerometer 38.

In the normal control of the hydrofoil shown herein, the change of height of the hull above the water is controlled solely by the forward flap 18. In order to raise the hull while foil-borne, the forward flap is rotated downwardly, thereby increasing the lift afforded by the forward foil 16 and causing the hull to pitch and rise above the water. In order to control pitching motions about the pitch axis, both the forward and aft control surfaces are employed. However, the forward and aft control surfaces operate in opposite directions to correct for any pitch errors. Compensation for movement about the roll axis is achieved solely by the aft surfaces 28, 30, 32 and 34. In this case, the starboard flaps move in a direction opposite to the port flaps to correct for any undesired rolling motion. In turning the craft, the aft flaps are initially positioned to cause the craft to bank about its roll axis, and the rudder 12 is then rotated to coordinate the turn. This gives a much better and smoother turning action since the correct roll inclination is achieved to keep the total acceleration vector substantially normal to the deck of the craft. This also reduces the strut side forces to zero in a perfectly coordinated turn.

The particular hydrofoil control system described herein forms the subject matter of the above-mentioned copending application Ser. No. 302,559. The present invention, however, can be used with any hydrofoil control system.

Figure 3:
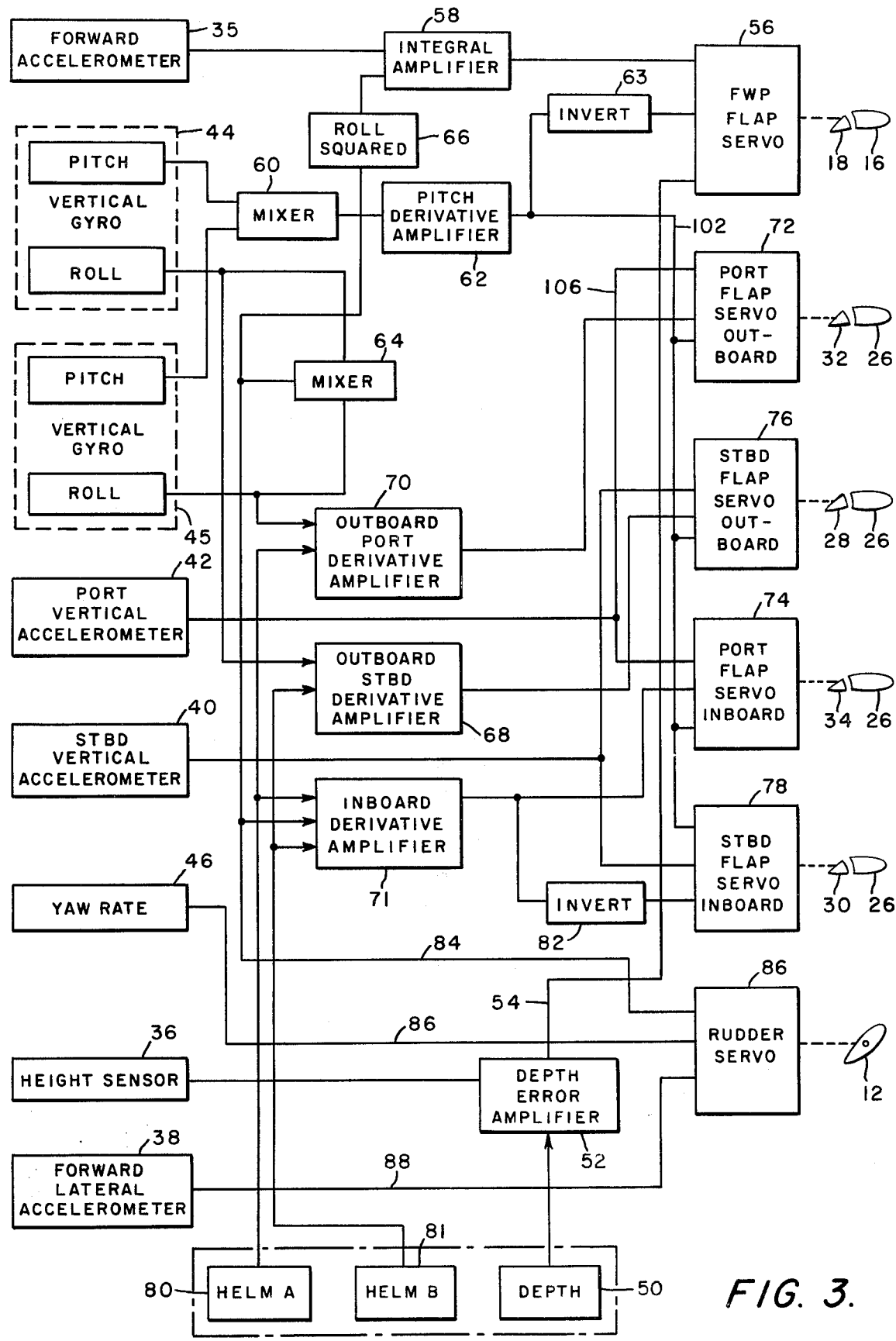
FIG. 3 is a block schematic diagram showing one embodiment of the invention employing dual helm synchros and roll gyros.

The control system is shown in the form of a block diagram in FIG. 3. As shown, the signal from the height sensor 36 proportional to actual height of the craft above the water surface is compared with a height signal from the pilothouse depth control 50 in a depth error amplifier 52. If the two signals fed to the amplifier 52 are not the same, then an error signal is developed on lead 54 and applied to a forward flap servo system 56 which causes the forward flap 18 to rotate downwardly or upwardly, depending upon whether the hull should rise or descend.

The forward accelerometer 35 senses acceleration at the bow, either upward or downward, and produces an electrical signal for controlling the forward flap 18 to counteract movement about the pitch axis of the craft. The output of the forward accelerometer 35, however, is combined in an integral amplifier 58 with a signal proportional to the square of the roll motion signal, derived as described hereinafter, before the combined signal is applied to the forward flap servo 56. This is for the reason that during normal rolling action, or while the craft is being banked during a turn, the rolling movement produces a reduction in the vertical component of foil lift which must be restored through flap-induced lift.

A signal proportional to the angle of the craft about the pitch axis is derived from the vertical gyros 44 and 45. These two gyros are substantially identical, and the pitch signals produced by the two gyros are combined in a mixer 60 and applied to a derivative amplifier 62 to produce an output signal which varies as a function of pitch angle from the horizontal as well as the rate of change of the pitch angle. The output of the pitch derivative amplifier 62 is applied to all of the aft flap servos and is also applied in inverted form via inverter 63 to the forward flap servo 56 to achieve differential control. This signal is used for stability augmentation, ride smoothing in a seaway, and automatic pitch trim control.

If the craft is rolling about its roll axis, signals are derived from the vertical gyros 44 and 45. The signals from these gyros are normally identical and are proportional to the angle of the craft from vertical about the roll axis. The two signals are combined in a mixer 64 to provide a signal which is applied to the roll squared circuit 66 for combination with the forward accelerometer signal as described above. In addition, the roll signal from the vertical gyro 44 is applied to an outboard starboard derivative amplifier 68; and the output from the roll gyro 45 is applied to an outboard port derivative amplifier 70. The signals applied to these amplifiers will, of course, increase in one direction or polarity and then decrease to zero and increase in the other polarity as the craft rolls from side-to-side. The output of the mixer 64 is also applied to the input of an inboard derivative amplifier 71 which acts for both the port and starboard inboard flaps. Also applied to the derivative amplifiers 68, 70 and 71 are signals from two redundant helm synchros 80 and 81. In this respect, the output of helm synchro 80 is applied to the outboard port derivative amplifier 70 as well as the inboard derivative amplifier 71; whereas the output of helm synchro 81 is applied to the inboard derivative amplifier 71 as well as the outboard starboard derivative amplifier 68.

At the beginning of a turn, and assuming that the water through which the hydrofoil is traveling is smooth, the signal at the output of mixer 64 will be zero, or substantially zero. The roll derivative amplifiers 68–71 compare the signal from mixer 64 with that from one or both of the helm synchros 80 and 81; and assuming that the two are not the same, then an output signal appears at the outputs of amplifiers 68–71. The output of outboard port derivative amplifier 70 is applied to the port flap outboard servo 72; whereas that from derivative amplifier 68 is applied to the starboard outboard servo 76. The output of the inboard derivative amplifier 71 is applied to both the port flap inboard servo 74 as well as the starboard flap inboard servo 78; however before it is applied to servo 78, it is inverted in inverter 82.

Assuming, again, that the craft is not rolling and that the outputs of the helm synchros 80 and 81 are zero, then no outputs will be derived from the derivative amplifiers 68–71. When it is desired to effect a turn, however, the helm is rotated, thereby producing outputs from the synchros 80 and 81. This generates outputs from amplifiers 68–71 which causes one set of aft flaps (port or starboard) to rotate downwardly while the other set rotates upwardly to cause the craft to bank about its roll axis. This action will continue until the angle of roll as sensed by the gyros 44 and 45 at the output of mixer 64 is such as to generate a signal which nulls out the helm signal from synchro 80 and/or 81. However, at the same time, the signal at the output of mixer 64 on lead 84, proportional to roll angle, is also applied to the rudder servo 86. This causes the rudder 12 to rotate as the craft begins to bank about its roll axis, allowing the craft to turn in a coordinated manner in the direction to which the craft has been banked. Thus, as the craft banks to the right, for example, in response to a signal or signals from the helm synchros 80 and 81, the rudder 12 will rotate to the right. When the turn is completed and the pilot rotates the helm in the opposite direction to bring the craft back onto a straight course, the signals from synchros 80 and 81 will no longer match those from the gyros 44 and 45 and the mixer 64. As a consequence, the aft flaps and rudder are caused to rotate in directions which are opposite to those which initiated the turn. This will cause the craft to come back to dead center from its roll inclination; whereupon the outputs of the roll gyros will again match the output of the helm synchros 80 and 81 and the turn has been completed.

As the ship turns, the yaw rate gyro 46 will produce a signal on lead 84 proportional to the rate of turning about the yaw axis; and this is utilized in the rudder servo 86 to limit the rate of turning. The same is true of the forward lateral accelerometer 38 which produces a signal on lead 88 proportional to lateral acceleration. This is applied to the rudder servo 86 in order to limit the lateral acceleration. Thus, if the craft is turning into a position where it is broadside to the direction of a strong wind and accompanying waves, the yaw rate gyro 46 and lateral accelerometer 38 will sense the thrust on the craft and limit the rate of turning.

The remaining control actions are primarily for the purpose of eliminating or minimizing undesirable pitching and rolling actions. Assuming that the craft is rolling about its roll axis, signals will be produced at the inputs to derivative amplifiers 68–71 which first increase in one direction or polarity, then recede back to zero and increase in the other direction or polarity and again recede back to zero as the craft rolls from side-to-side. This again produces at the outputs of the derivative amplifiers 68–71 signals which vary as a function of both the roll angle as well as the rate of change in roll angle. The signals from derivative amplifiers 68–71 are applied to the aft flap port and starboard servos so as to achieve differential action that counteracts the rolling movement.

The output of port vertical accelerometer 42 is applied to both the inboard and outboard port flap servos 72 and 74 and acts to vary the aft port flap positions to counteract any vertical acceleration or heave on the portside. Similarly, the output of the starboard vertical accelerometer 40 is applied to both the inboard and outboard starboard flap servos 76 and 78 to achieve the same action and counteract vertical accelerations on the starboard side of the craft.

As was mentioned above, and because of the large moment arms of the outboard flaps with respepct to the inboard flaps, failure of both inboard flaps is essentially equal to failure of either outboard flap. By utilizing a single roll control channel for both inboard flaps, therefore, a considerable savings in circuitry is achieved without sacrificing reliability and safety. Instead of feeding the helm signals to the derivative amplifiers 68–71, it is also possible to apply the helm signals directly to the flap servos 72–78, in which case the control action is somewhat different, but achieves the same result.

Figure 4:
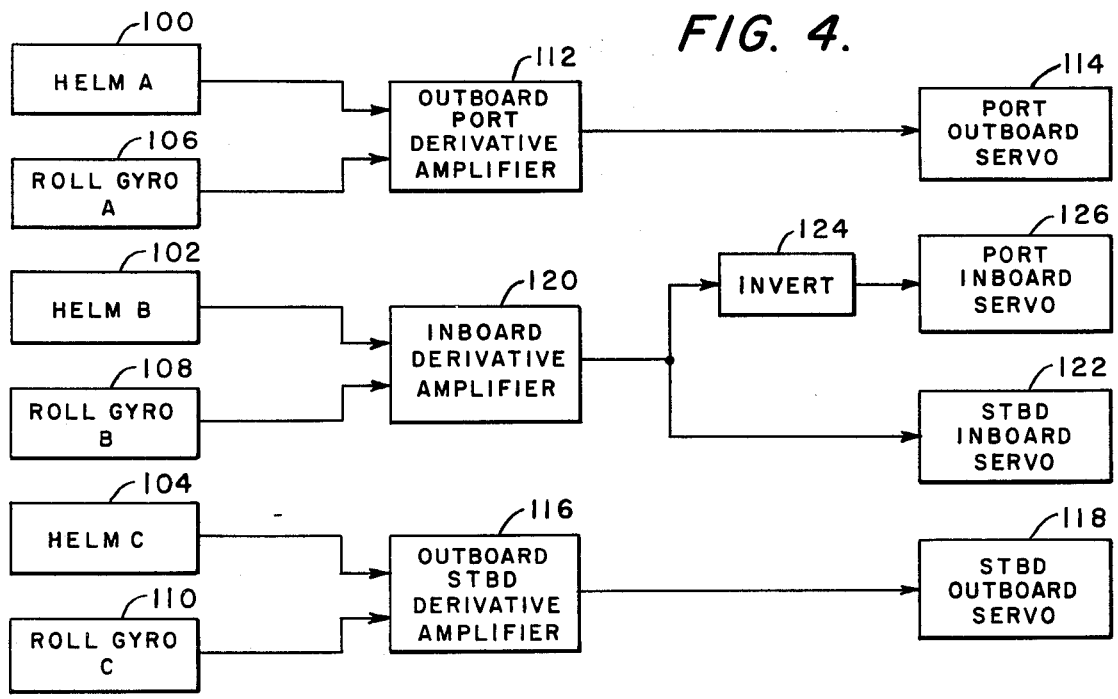
FIG. 4 is a block schematic diagram of another embodiment of the invention employing three roll gyros and three helm synchros.

In FIG. 4, there is shown a simplified schematic circuit diagram of a control system utilizing only three roll channels in combination with three helm synchros and three roll gyros. It will be understood, of course, that a complete system will include the additional elements shown in FIG. 3 such as the accelerometers, a yaw rate gyro, a height sensor, and the like. In the system of FIG. 4, three helm synchros 100, 102 and 104 are provided together with three roll gyros 106, 108 and 110. Helm synchro 100 and roll gyro 106 feed signals to a first outboard port derivative amplifier 112, the output of this derivative amplifier being applied to the port outboard servo 114 only.

Similarly, the outputs of helm synchro 104 and roll gyro 110 are applied to the outboard starboard derivative amplifier 116, the output of the derivative amplifier being applied to the starboard outboard servo 118 only. The inboard servos, however, are both responsive to signals from the helm synchro 102 and roll gyro 108. That is, the outputs of synchro 102 and gyro 108 are applied to the inboard derivative amplifier 120. The output of derivative amplifier 120 is applied directly to the starboard inboard servo 122 and is inverted in inverter 124 and applied to the port inboard servo 126 to achieve differential action. The system of FIG. 4, of course, has a somewhat greater degree of reliability than that of FIG. 3 since three helm synchros and roll gyros are employed rather than only two.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a control system for a hydrofoil craft having inboard and outboard port control surfaces and inboard and outboard starboard control surfaces for controlling the craft about its roll axis, the combination of:

means for sensing motion of the craft about its roll axis and for producing at least one electrical signal proportional thereto, at least three signal channels responsive to an electrical signal proportional to roll motion for controlling said port and starboard control surfaces, the output of one of said channels controlling only the outboard starboard control surface, the output of a second of said channels controlling only the outboard port control surface, and the output of the third of said channels controlling both of said inboard control surfaces only without controlling said outboard control surfaces.

2. The control system of claim 1 wherein said means for sensing motion of the craft about its roll axis includes a plurality of roll gyros which produce a plurality of electrical signals proportional to motion of the craft about its roll axis.

3. The control system of claim 2 wherein there are three roll gyros each of which feeds into an associated one of the three signal channels.

4. The control system of claim 2 wherein there are two roll gyros, means for applying the output of one roll gyro to the input of the first of said signal channels, means for applying the output of the other of said roll gyros to the second of said signal channels, and means for mixing the outputs of said roll gyros and for applying the mixed output to the input of said third signal channel.

5. The control system of claim 1 including helm synchro means for producing at least one electrical signal proportional to rotation of the helm from its central null position, and means for applying said electrical signal to at least one of said signal channels.

6. The control system of claim 5 wherein a helm signal is applied to each of said signal channels and compared with the output of said means for sensing motion.

* * * * *